United States Patent
Yu et al.

(10) Patent No.: US 10,740,904 B2
(45) Date of Patent: Aug. 11, 2020

(54) IMAGE SEGMENTATION METHOD AND DEVICE

(71) Applicant: ABC FINTECH CO., LTD., Beijing (CN)

(72) Inventors: Zhou Yu, Beijing (CN); Yongzhi Yang, Beijing (CN); Meng Guo, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 294 days.

(21) Appl. No.: 15/955,622

(22) Filed: Apr. 17, 2018

(65) Prior Publication Data
US 2019/0266731 A1    Aug. 29, 2019

(30) Foreign Application Priority Data
Feb. 26, 2018 (CN) .......................... 2018 1 0159647

(51) Int. Cl.
| | |
|---|---|
| *G06T 7/143* | (2017.01) |
| *G06K 9/62* | (2006.01) |
| *G06K 9/66* | (2006.01) |
| *G06N 3/08* | (2006.01) |
| *G06K 9/34* | (2006.01) |

(52) U.S. Cl.
CPC .............. *G06T 7/143* (2017.01); *G06K 9/344* (2013.01); *G06K 9/6202* (2013.01); *G06K 9/6281* (2013.01); *G06K 9/66* (2013.01); *G06N 3/084* (2013.01); *G06K 2209/011* (2013.01)

(58) Field of Classification Search
CPC ............. G06K 2209/011; G06K 9/344; G06K 9/6202; G06K 9/6281; G06K 9/66; G06N 3/0454; G06N 3/084; G06T 2207/20084; G06T 7/11; G06T 7/143; G06T 7/194
See application file for complete search history.

(56) References Cited

U.S. PATENT DOCUMENTS

2017/0213112 A1\*  7/2017  Sachs ................. G06K 9/00228

\* cited by examiner

*Primary Examiner* — Kim Y Vu
*Assistant Examiner* — Michael J Vanchy, Jr.
(74) *Attorney, Agent, or Firm* — Morgan, Lewis & Bockius LLP

(57) ABSTRACT

The present application relates to an image segmentation method and device operating on an electronic device. The image segmentation method comprises the following steps: performing deep learning to obtain an FCN (Fully Convolutional Network) model, and calculating the loss using $L(p_{ji}) = -(1-p_{ji})^r \log(p_{ji})$ in the deep learning process; inputting an image to be segmented to the last updated FCN model to obtain the probability that each pixel in the image to be segmented is in each of the categories, and selecting the category corresponding to the maximum probability as the category determined by the image segmentation for the pixel. By improving the loss function of the FCN model, the accuracy of image classification is improved, and chart information in an electronic document is accurately extracted by means of pixel classification.

15 Claims, 3 Drawing Sheets

IMAGE SEGMENTATION METHOD AND DEVICE

CROSS-REFERENCE TO RELATED APPLICATION

This application claims the benefit of Chinese Patent Application No. 201810159647.7, filed Feb. 26, 2018 with State Intellectual Property Office, the People's Republic of China, the entire content of which is incorporated by reference herein.

TECHNICAL FIELD

The present application relates to the technical field of data processing, and particularly, relates to an image segmentation method and device based on an FCN model.

BACKGROUND

Deep learning networks for image segmentation include FCNs (Fully Convolutional Networks) such as U-NET, SEGNET and the like, which can achieve pixel semantic segmentation in some natural scenes. In the currently existing segmentation model based on deep learning, the final pixel classification is defined according to the general classification model (cross entropy) loss. Generally, the classification model requires that the number of samples in each category is as equal as possible. If the number of samples under one or more categories is much larger than that of samples under other categories, that is, the categories are unbalanced, the learning effect is often not satisfactory. For example, in a chart image, the background pixels occupy the vast majority of the area, while the title text only accounts for a very small proportion, then a very unbalanced state of categories occurs, e.g., if a standard multi-category cross entropy loss function is adopted for classification, the classification model tends to classify all pixels into the background, resulting in inaccurate pixel segmentation.

SUMMARY

The objective of the present application is to overcome the defect in the prior art that pixel segmentation is inaccurate when the existing categories are unbalanced, and to provide an image segmentation method and device that can improve the accuracy of pixel segmentation.

In order to fulfill the above objective, the embodiments of the present application provide the following technical solutions:

In one aspect, an embodiment of the present application provides an image segmentation method, including the following steps:

step A. inputting a sample image to an initialized FCN model to obtain the probability $p_{ji}$ of each pixel in the sample image being in a category under the current model parameters, $p_{ji}$ representing the probability that the $j^{th}$ pixel in the sample image is in the $i^{th}$ category;

step B. calculating the loss of the output result in step A by adopting the following formula, and solving the average loss $\overline{L}$ of all pixels in the sample image; $L(p_{ji})=-(1-p_{ji})^r \log(p_{ji})$, in which $L(p_{ji})$ is the loss of the $j^{th}$ pixel, and r is a real number between 0 to 4;

step C. solving the minimum $\overline{L}$, and updating all learning parameters in the FCN model;

step D. repeatedly executing steps A to C until reaching a set number of iterations; and step E. inputting an image to be segmented to the last updated FCN model to obtain a probability that each pixel in the image to be segmented is in each of the categories, and selecting the category corresponding to the maximum probability as the category determined by the image segmentation for the pixel.

When a standard loss function is adopted, the classification error proportion of a legend text, for example, is large for the category with a few pixels. When the above method calculates the loss by adopting the improved loss function, the convergence speed is improved in the training process, the segmentation effect on the category with a few pixels, such as the legend text, is superior to that adopting the conventional cross entropy loss, and the accuracy of pixel classification is greatly improved.

In another aspect, an embodiment of the present application provides an image segmentation device, including:

a parameter setting module, configured to set learning parameters in an FCN model, including initializing the learning parameters in the FCN model and updating the learning parameters in the FCN model during iterations;

an image input module, configured to input a sample image to be segmented into the FCN model;

a probability output module, configured to output the probability $p_{ji}$ of each pixel category in the sample image being in a category under the current model parameters from the FCN model, $p_{ji}$ representing the probability that the $j^{th}$ pixel in the sample image is in the $i^{th}$ category;

a loss calculation module, configured to calculate the loss of the output result of the probability output module by adopting the following formula, and solving the average loss $\overline{L}$ of all pixels in the image: $L(p_{ji})=-(1-p_{ji})^r \log(p_{ji})$, in which $L(p_{ji})$ is the loss of the $j^{th}$ pixel, and r is a real number between 0 to 4; and a minimum average loss solving module, configured to solve the minimum $\overline{L}$ and output the solved minimum $\overline{L}$ to the parameter setting module to update the learning parameters in the FCN model;

wherein after the learning parameters in the FCN model are updated, the image input module inputs the sample image to the updated FCN model again, and the probability output module, the loss calculation module and the minimum average loss solving module repeat the iteration, until reaching the set number of iterations;

the image segmentation device further includes a category selection module, configured to output a probability that each pixel in the image to be segmented is in each of the categories from the last updated FCN model, and select the category corresponding to the maximum probability as a category determined for the pixel.

In another aspect, an embodiment of the present application simultaneously provides a computer readable storage medium including computer readable instructions, wherein a processor executes the operations in the method of the embodiment of the present application when the computer readable instructions are executed.

In another aspect, an embodiment of the present application simultaneously provides electronic equipment, including: a memory, configured to store program instructions; and a processor, connected with the memory, and configured to execute the program instructions in the memory to implement the steps of the method in the embodiment of the present application.

Compared with the prior art, the present application has the advantages that by improving the loss function of the FCN model, the accuracy of image classification is improved, and chart information in an electronic document is accurately extracted by means of pixel classification; a chart in the document can be redrawn via the information, and the chart can be subject to retrieval, analysis and other processes according to these elements.

BRIEF DESCRIPTION OF THE DRAWINGS

In order to illustrate the technical solutions in the embodiments of the present application more clearly, a brief introduction will be made below to the drawings required in the embodiments. It should be understood that the drawings below only show some embodiments of the present application and should not be regarded as limit to the scope, and other relevant drawings could be obtained based on these drawings by those of ordinary skill in the art without any creative efforts.

DETAILED DESCRIPTION OF THE EMBODIMENTS

Figure 1:
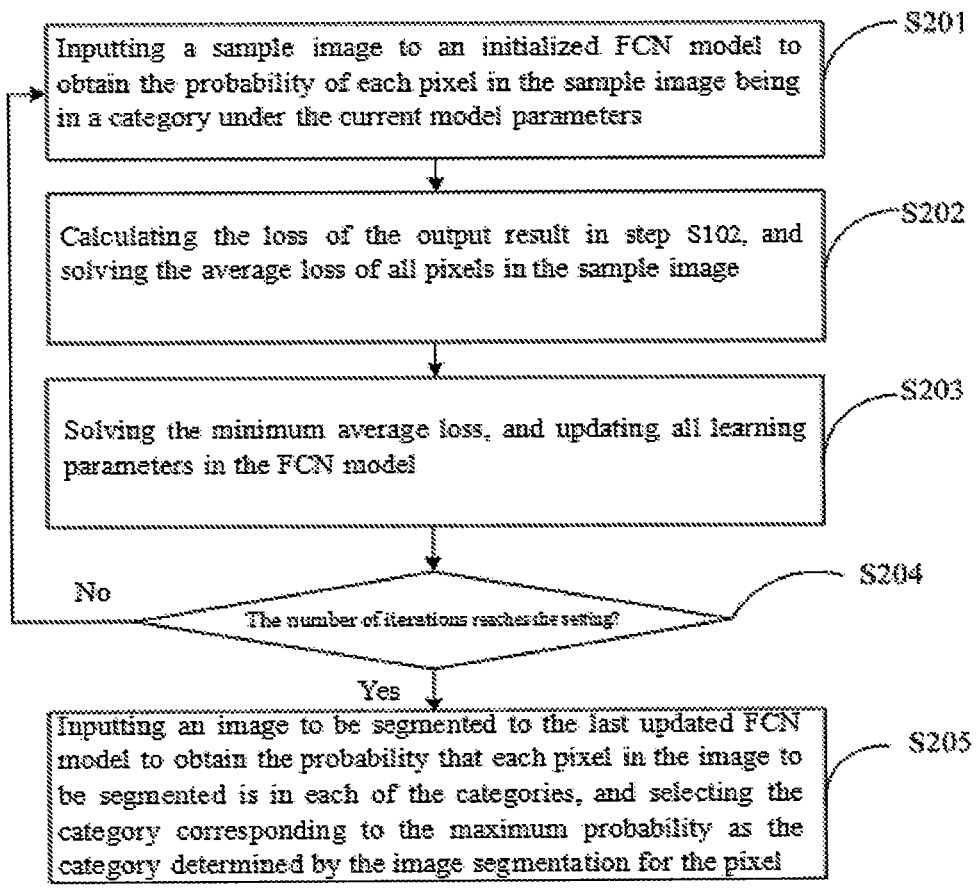
FIG. 1 is a flow diagram of an image segmentation method according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Referring to FIG. 1, this embodiment of the present application provides an image segmentation method, specifically, including the following steps:

S201, input a sample image to an initialized FCN model to obtain the probability $p_{ji}$ of each pixel in the sample image being in a category under the current model parameters, wherein $p_{ji}$ represents the probability that the $j^{th}$ pixel in the sample image is in the $i^{th}$ category.

The initialization refers to initializing learning parameters in the FCN model, wherein the learning parameters include a weight matrix of each layer in convolutional layers, for example, the weight is initially set to a random number with a mean value of 0 and a variance of 0.002.

It should be noted that, for different applications, the categories of pixel classification may be different. In this embodiment, taking a chart image as an example only, the categories of pixel classification may include background, Y axis, X axis, Y axis text, X axis text, legend, legend text, title text, etc. For example, when the pixel categories include the background, the Y axis, the X axis, the Y axis text, the X axis text, the legend, the legend text and the title text, i=0, 1, 2, 3, 4, 5, 6, 7. That is, for each pixel, eight probability values corresponding to the pixel are obtained, and each probability value indicates the probability that the pixel is in a corresponding category.

It should be further noted that, in this embodiment, only a chart image is taken as an example for illustration. However, the FCN model described in this embodiment may be applied to the segmentation of any image, including images with balanced or unbalanced categories. In the case of unbalanced categories such as chart images, the effect of improving the accuracy of pixel segmentation is more obvious than that of the conventional method.

S202, calculate the loss of the output result in step S102 by using marks in a mask image. The mask image herein corresponds to the chart image, and the mask image has the same size as the chart image. Each pixel in the mask image indicates the corresponding category of each pixel in the corresponding chart image, the categories are expressed with the values of 0-255 herein, e.g., the background is marked as 0, the Y axis is marked as 1, the X axis is marked as 2, etc., that is to say, each pixel in the mask image is marked with a value of 0~255. After the chart image is generated, a mask image is correspondingly generated. Both the chart image and the mask image are used as training samples.

Specifically, in this step, the loss is calculated by adopting the following formula: $L(p_{ji}) = -(1-p_{ji})^r \log(p_{ji})$, in which $L(p_{ji})$ is the loss of the $j^{th}$ pixel, r may be a real number between 0 and 4, and particularly for the applications with unbalanced categories, r is preferably 2. It should be noted that $p_{ji}$ represents the probability that the $j^{th}$ pixel is in the $i^{th}$ category, wherein the pixel input to the $i^{th}$ category needs to be acquired from the mask image. For example, if the $j^{th}$ pixel is a background pixel, i=0, then only one $p_{ji}$ is calculated, that is, only the $p_{j0}$ is selected for the loss calculation. For another example, if the $j^{th}$ pixel is an X axis pixel, i=2, then only one $p_{j2}$ is selected for the loss calculation.

After the losses of all pixels in a chart image are calculated, the average loss $\bar{L}$ of all the pixels is solved.

S203, solve the minimum $\bar{L}$ by adopting a back propagation and gradient descent algorithm, for example, and update all the learning parameters in the FCN model. The back propagation and the gradient descent algorithm is a standard method for parameter update in a neural network. When the parameters are updated, the gradient descent method, i.e., a method of finding W corresponding to the optimal solution $\bar{L}$, is adopted. The specific step is as follows: solving a derivative for each parameter W in a loss function, finding out a negative gradient direction dW of each parameter, and then performing a small step update, i.e., updating the weight W=W+learning_rate*dW, wherein learning_rate is a learning rate or is understood as an update step length, for example, is set to 0.001. This step is iterated. Because the derivative is solved from a composite function (multilayer neural network), the chain rule in calculus is adopted. The chain rule is embodied as back propagation (BP) in the neural network, and BP is a dedicated term in the neural network. dW is calculated forward in sequence from the last layer.

S204, repeatedly execute steps S102 to S104 until reaching a set number of iterations. When the number of iterations is set, its minimum should at least guarantee that the minimum $\overline{L}$ in step S104 no longer decreases.

The FCN model obtained via the above steps can be used for pixel segmentation of an image, thus improving the accuracy of pixel segmentation.

S205, input an image to be segmented to the last updated FCN model to obtain a probability that each pixel in the image to be segmented is in each of the categories, and select the category corresponding to the maximum probability as the category determined by the image segmentation for the pixel.

In step S205, specifically, the image to be segmented is input to the FCN model trained in steps S201 to S204, and after the category probability corresponding to each pixel is obtained, the category corresponding to the maximum probability is obtained, and then the pixel category can be obtained. For example, the categories of pixel classification include a background (i=0), a Y axis (i=1), an X axis (i=2), a Y axis text (i=3), an X axis text (i=4), a legend (i=5), a legend text (i=6) and a title text (i=7), the chart image to be segmented is input to the FCN model optimized by steps S201 to S204 to obtain the probability values of the $j^{th}$ pixel respectively: $p_{j0}$=0.94, $p_{j1}$=0.01, $p_{j2}$=0, $p_{j3}$=0, $p_{j4}$=0, $p_{j5}$=0, $p_{j6}$=0 and $p_{j7}$=0.05, and then the $j^{th}$ pixel can be obtained as a background pixel.

Figure 3:
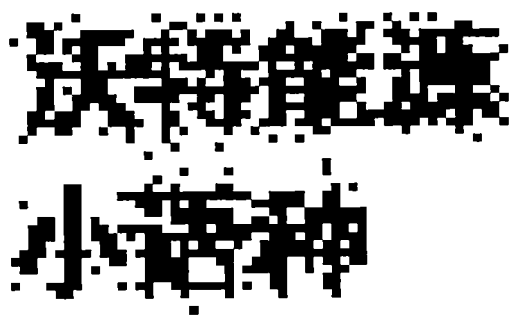
FIG. 3 is an image obtained by restoration after being segmented by adopting a conventional image segmentation method according to some embodiments of the present application.
Figure 4:
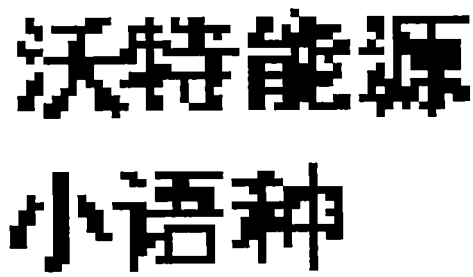
FIG. 4 is an image obtained by restoration after being segmented by adopting the image segmentation method according to some embodiments of the present application.

Referring to FIG. 3 and FIG. 4, pixel segmentation is performed on the same sample image by adopting the conventional method (standard loss function) and the image segmentation method (improved loss function) of the present application respectively. The results are shown in the following table and FIG. 3 and FIG. 4. Obviously, the image segmentation method of the present application can greatly improve the accuracy of pixel segmentation.

| | Average pixel classification accuracy in image (1000 generated chart samples) |
|---|---|
| Conventional loss function | 99.65% |
| Improved loss function | 99.92% |

Referring to FIG. 3 and FIG. 4, particularly in the text area, the segmentation effect obtained by the conventional loss function is poor, whereas the effect obtained by the improved loss function is obviously improved.

Figure 2:
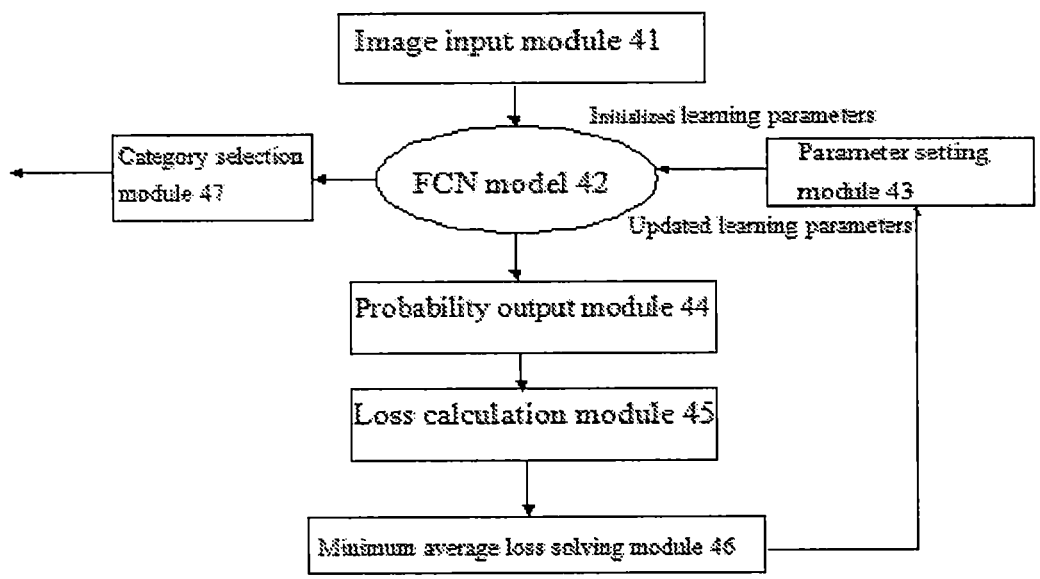
FIG. 2 is a schematic diagram of functional modules of an image segmentation device according to some embodiments of the present application.

Referring to FIG. 2, based on the same inventive concept as the method shown in FIG. 1, an embodiment of the present application further provides an image segmentation device. For the part not involved in the description of the image segmentation device, reference may be made to the corresponding description in the method shown in FIG. 1. As shown in FIG. 2, the image segmentation device mainly includes an image input module 41, an FCN model 42, a parameter setting module 43, a probability output module 44, a loss calculation module 45, a minimum average loss solving module 46 and a category selection module 47.

The image input module 41 is configured to input an image to be segmented to the FCN model 42, wherein the input images include a sample image in the deep learning process and an image to be processed in image segmentation;

The parameter setting module 43 is configured to set learning parameters in the FCN model 42, including learning parameters in the initialized FCN model and learning parameters in the updated FCN model during iterations;

The probability output module 44 is configured to output the probability $p_{ji}$ of each pixel in the sample image being in a category under the current model parameters from the FCN model, wherein $p_{ji}$ represents the probability that the $j^{th}$ pixel in the image is in the $i^{th}$ category; for example, in term of a chart image, the categories of pixel classification include background, Y axis, X axis, Y axis text, X axis text, legend, legend text, title text, etc. For example, when the pixel categories include the background, the Y axis, the X axis, the Y axis text, the X axis text, the legend, the legend text and the title text, i=0, 1, 2, 3, 4, 5, 6, 7.

The loss calculation module 45 is configured to calculate the loss of the output result in the probability output module 43 by adopting the following formula, and solve the) average loss $\overline{L}$ of all pixels in the sample image; $L(p_{ji})=-(1-p_{ji})^r \log(p_{ji})$, in which $L(p_{ji})$ is the loss of the $j^{th}$ pixel, and r is a real number between 0 to 4;

The minimum average loss solving module 46 is configured to solve the minimum $\overline{L}$, for example, solve the minimum $\overline{L}$ via a back propagation and gradient descent algorithm, and output the solved minimum $\overline{L}$ to the parameter setting module 41, so that the parameter setting module 41 updates all learning parameters in the FCN model.

After the learning parameters in the FCN model are updated, the image input module 41 inputs the sample image to the updated FCN model 42 again, and the probability output module 44, the loss calculation module 45 and the minimum average loss solving module 46 repeat the iteration until reaching a set number of iterations, that is to say, the modules 41-46 complete the deep learning process of the FCN model, and the model 47 completes the image segmentation of the specific application.

The category selection module 47 is configured to output a probability that each pixel in the image to be segmented is in each of categories from the last updated FCN model, and select the category corresponding to the maximum probability as the category determined for the pixel.

Figure 5:
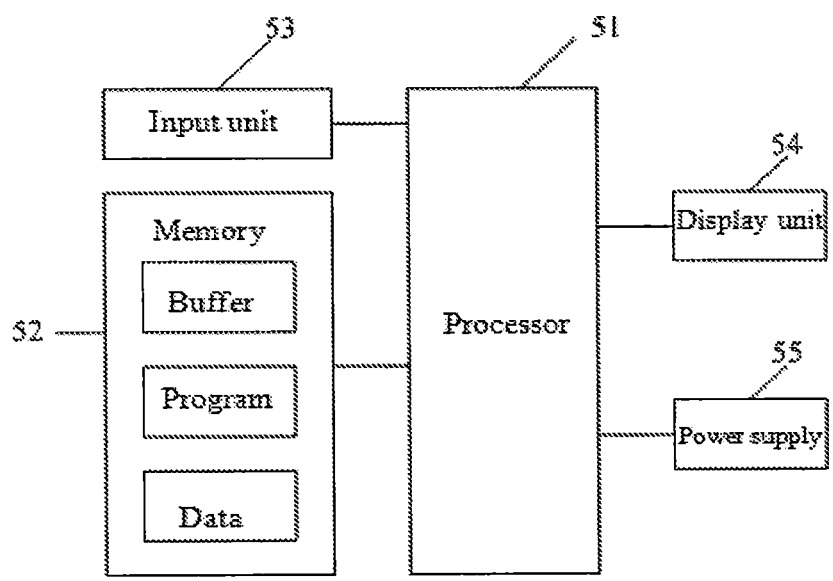
FIG. 5 is a structure block diagram of the electronic equipment according to some embodiments of the present application.

As shown in FIG. 5, this embodiment provides an electronic equipment. The electronic equipment may include a processor 51 and a memory 52, wherein the memory 52 is coupled to the processor 51. It is worth noting that the figure is exemplary, and the structure may also be supplemented or replaced with other structure to realize data extraction, chart redrawing, communication or other functions.

As shown in FIG. 5, the electronic equipment may further include an input unit 53, a display unit 54 and a power supply 55. It should be noted that the electronic equipment does not necessarily include all components shown in FIG. 5. Moreover, the electronic equipment may further include components not shown in FIG. 5, referring to the prior art.

The processor 51 is also referred to as a controller or an operation control sometimes, and may include a microprocessor or other processor device and/or logic device. The processor 51 receives an input and controls the operation of each component of the electronic equipment.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded chart data and other information. The processor 51 may execute a program stored in the memory 52 to implement information storage or processing or the like. In one embodiment, the memory 52 further includes a buffer memory, i.e., a buffer, to store intermediate information.

The input unit 53 may be, for example, a file reading device, and is configured to provide the processor 51 with an electronic document containing a chart. The display unit 54 is configured to display image information restored after pixel segmentation. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method as shown in FIG. 1.

An embodiment of the present application further provides a storage medium storing a computer readable instruction, wherein the computer readable instruction enables the electronic equipment to execute the operation steps included in the method as shown in FIG. 1.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and algorithm steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding steps in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

In addition, the functional units in the embodiments of the present application may be integrated into one processing unit, or each of the units may exist alone physically, or two or more units may be integrated into one unit. The integrated unit may be implemented in the form of hardware, or may be implemented in the form of a software functional unit.

When the integrated unit is realized in the form of a software functional unit and sold or used as an independent product, the integrated unit may be stored in a computer readable storage medium. Based on such an understanding, the technical solution of the present application substantially, or all or part of the present application making contribution to the prior art, or a part of the technical solution may be embodied in the form of a software product, and the computer software product is stored in a storage medium, which includes a plurality of instructions enabling computer equipment (which may be a personal computer, a server, or network equipment or the like) to execute all or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. An image segmentation method performed by an electronic device having a processor, a display, and memory for storing instruction to be executed by the processor, the method comprising:
   step A. inputting, by the electronic device, a sample image to an initialized FCN model to obtain the probability $p_{ji}$ of each pixel in the sample image being in a category under the current model parameters, $p_{ji}$ representing the probability that the $j^{th}$ pixel in the sample image is in the $i^{th}$ category;
   step B. calculating, by the electronic device, a loss of the output result in step A by adopting the following formula, and solving the average loss $\overline{L}$ of all pixels in the sample image; $L(p_{ji})=-(1-p_{ji})^r \log(p_{ji})$, in which $L(p_{ji})$ is the loss of the $j^{th}$ pixel, and r is a real number between 0 to 4;
   step C. solving, by the electronic device, the minimum $\overline{L}$, and updating all learning parameters in the FCN model;
   step D. repeatedly executing, by the electronic device, steps A to C until reaching a set number of iterations; and
   step E. inputting, by the electronic device, an image to be segmented to the last updated FCN model to obtain a probability that each pixel in the image to be segmented is in each of the categories, and selecting the category corresponding to the maximum probability as the category determined for the pixel.

2. The method according to claim 1, wherein the image to be segmented is a chart image, and the pixel categories comprise background, Y axis, X axis, Y axis text, X axis text, legend, legend text and title text.

3. The method according to claim 1, wherein in step D, the minimum $\overline{L}$ is solved by adopting a back propagation and gradient descent algorithm.

4. The method according to claim 1, wherein the minimum value of the number of iterations set in step D should ensure that the obtained $\overline{L}$ no longer decreases.

5. The method according to claim 1, wherein r=2 is selected in the loss function.

6. An electronic device, comprising:
a processor;
memory; and
a plurality of computer instructions stored in the memory, wherein the computer instructions, when executed by the processor, cause the electronic device to perform operations including:
step A. inputting, by the electronic device, a sample image to an initialized FCN model to obtain the probability $p_{ji}$ of each pixel in the sample image being in a category under the current model parameters, $p_{ji}$ representing the probability that the $j^{th}$ pixel in the sample image is in the $i^{th}$ category;
step B. calculating, by the electronic device, a loss of the output result in step A by adopting the following formula, and solving the average loss $\overline{L}$ of all pixels in the sample image; $L(p_{ji})=-(1-p_{ji})^r \log(p_{ji})$, in which $L(p_{ji})$ is the loss of the $j^{th}$ pixel, and r is a real number between 0 to 4;
step C. solving, by the electronic device, the minimum $\overline{L}$, and updating all learning parameters in the FCN model;
step D. repeatedly executing, by the electronic device, steps A to C until reaching a set number of iterations; and
step E. inputting, by the electronic device, an image to be segmented to the last updated FCN model to obtain a probability that each pixel in the image to be segmented is in each of the categories, and selecting the category corresponding to the maximum probability as the category determined for the pixel.

7. The electronic device according to claim 6, wherein the image to be segmented is a chart image, and the pixel categories comprise background, Y axis, X axis, Y axis text, X axis text, legend, legend text and title text.

8. The electronic device according to claim 6, wherein in step D, the minimum $\overline{L}$ is solved by adopting a back propagation and gradient descent algorithm.

9. The electronic device according to claim 6, wherein the minimum value of the number of iterations set in step D should ensure that the obtained $\overline{L}$ no longer decreases.

10. The electronic device according to claim 6, wherein r=2 is selected in the loss function.

11. A non-transitory computer readable storage medium comprising computer readable instructions that, when executed by a processor of an electronic device, cause the electronic device to perform steps including:
step A. inputting, by the electronic device, a sample image to an initialized FCN model to obtain the probability $p_{ji}$ of each pixel in the sample image being in a category under the current model parameters, $p_{ji}$ representing the probability that the $j^{th}$ pixel in the sample image is in the $i^{th}$ category;
step B. calculating, by the electronic device, a loss of the output result in step A by adopting the following formula, and solving the average loss $\overline{L}$ of all pixels in the sample image; $L(p_{ji})=-(1-p_{ji})^r \log(p_{ji})$, in which $L(p_{ji})$ is the loss of the $j^{th}$ pixel, and r is a real number between 0 to 4;
step C. solving, by the electronic device, the minimum $\overline{L}$, and updating all learning parameters in the FCN model;
step D. repeatedly executing, by the electronic device, steps A to C until reaching a set number of iterations; and
step E. inputting, by the electronic device, an image to be segmented to the last updated FCN model to obtain a probability that each pixel in the image to be segmented is in each of the categories, and selecting the category corresponding to the maximum probability as the category determined for the pixel.

12. The non-transitory computer readable storage medium according to claim 11, wherein the image to be segmented is a chart image, and the pixel categories comprise background, Y axis, X axis, Y axis text, X axis text, legend, legend text and title text.

13. The non-transitory computer readable storage medium according to claim 11, wherein in step D, the minimum $\overline{L}$ is solved by adopting a back propagation and gradient descent algorithm.

14. The non-transitory computer readable storage medium according to claim 11, wherein the minimum value of the number of iterations set in step D should ensure that the obtained $\overline{L}$ no longer decreases.

15. The non-transitory computer readable storage medium according to claim 11, wherein r=2 is selected in the loss function.

* * * * *